United States Patent
Morris et al.

(10) Patent No.: US 9,483,605 B2
(45) Date of Patent: Nov. 1, 2016

(54) PROBABILISTIC HIGH CYCLE FATIGUE (HCF) DESIGN OPTIMIZATION PROCESS

(71) Applicant: UNITED TECHNOLOGIES CORPORATION, Farmington, CT (US)

(72) Inventors: Robert J. Morris, Portland, CT (US); Benjamin D. Hall, Glastonbury, CT (US); Lauren Gray, Newington, CT (US); Ming-Ta Yang, Carlisle, MA (US); Perry Bowes, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 428 days.

(21) Appl. No.: 14/134,530

(22) Filed: Dec. 19, 2013

(65) Prior Publication Data

US 2014/0358500 A1 Dec. 4, 2014

Related U.S. Application Data

(60) Provisional application No. 61/783,221, filed on Mar. 14, 2013.

(51) Int. Cl.
*G06F 17/50* (2006.01)
*F01D 5/16* (2006.01)
*F01D 21/00* (2006.01)

(52) U.S. Cl.
CPC ............ *G06F 17/5086* (2013.01); *F01D 5/16* (2013.01); *F01D 21/003* (2013.01); *G06F 17/5018* (2013.01); *F05D 2260/81* (2013.01); *F05D 2260/961* (2013.01); *G06F 2217/76* (2013.01)

(58) Field of Classification Search
USPC ...... 703/1, 2, 7; 73/862.01, 112.01; 267/136
See application file for complete search history.

(56) References Cited

U.S. PATENT DOCUMENTS

| | | | | |
|---|---|---|---|---|
| 7,469,885 B2* | 12/2008 | Englund | ................. | B64C 25/22 267/136 |
| 7,774,171 B2* | 8/2010 | Chou | .................... | G01M 9/065 703/1 |
| 2007/0089533 A1* | 4/2007 | Englund | ................. | B64C 25/22 73/862.01 |
| 2008/0281562 A1* | 11/2008 | Chou | .................... | G01M 9/065 703/1 |
| 2009/0316748 A1* | 12/2009 | Wawrzonek | ............. | G01N 3/18 374/46 |
| 2012/0152007 A1* | 6/2012 | Holmes | ................. | G01M 15/14 73/112.01 |

* cited by examiner

*Primary Examiner* — Thai Phan
(74) *Attorney, Agent, or Firm* — Cantor Colburn LLP

(57) ABSTRACT

A novel probabilistic method for analyzing high cycle fatigue (HCF) in a design of a gas turbine engine is disclosed. The method may comprise identifying a component of the gas turbine engine for high cycle fatigue analysis, inputting parametric data of the component over a predetermined parameter space into at least one computer processor, using the at least one computer processor to build a plurality of flexible models of the component based on the parametric data of the component over the predetermined parameter space, using the at least one computer processor to build a plurality of emulators of the component based on the plurality of flexible models, and using the at least one computer processor to predict a probability of HCF based at least in part on the parametric data of the component over the predetermined parameter space and the plurality of emulators.

20 Claims, 5 Drawing Sheets

PROBABILISTIC HIGH CYCLE FATIGUE (HCF) DESIGN OPTIMIZATION PROCESS

STATEMENT OF GOVERNMENT INTEREST

The United States Government has certain rights in this invention pursuant to contract number FA8650-09-D-2923 DO 0011 between the United States Air Force and United Technologies Corporation.

FIELD OF THE DISCLOSURE

The present disclosure relates generally to gas turbine engines and, more particularly, to systems and methods for assessing risk of high cycle fatigue in a gas turbine engine.

BACKGROUND OF THE DISCLOSURE

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

Various components of the gas turbine engine, such as fan, compressor, and turbine airfoils, are subject to high tensile and vibratory stress fields due to the high rotational speeds of the gas turbine engine rotors. Airfoil damage, such as cracking, or failure may result from high cycle fatigue (HCF) caused by the induced vibratory stress cycles. In addition, modern engine design trends have incorporated higher rotor speeds, higher stage pressure ratios, and reduced axial spacing; factors which all increase the strength of the disturbances exciting the engine components. Therefore, it is necessary to address HCF risk during design and validation of the various engine components.

Currently, design and validation practices to mitigate HCF risk are predominantly deterministic, single-point assessments that do not explicitly capture the inherent blade-to-blade and engine-to-engine variability in HCF behavior. Accordingly, there exists a need for HCF design, analysis, and validation techniques that recognize the inherent variability in manufactured components and usage of gas turbine engines.

SUMMARY OF THE DISCLOSURE

According to one embodiment of the present disclosure, a method for analyzing high cycle fatigue (HCF) in a design of a gas turbine engine is disclosed. The method may comprise identifying a component of the gas turbine engine for high cycle fatigue analysis, inputting parametric data of the component over a predetermined parameter space into at least one computer processor, using the at least one computer processor to build a plurality of flexible models of the component based on the parametric data of the component over the predetermined parameter space, using the at least one computer processor to build a plurality of emulators of the component based on the plurality of flexible models, and using the at least one computer processor to predict a probability of HCF based at least in part on the parametric data of the component over the predetermined parameter space and the plurality of emulators.

In a refinement, the method may further comprise using the at least one computer processor to assess a response due to mistuning and damping.

In a related refinement, the method may further comprise using the at least one computer processor to combine the response due to mistuning and damping on the component with the plurality of emulators, and to predict the probability of HCF based at least in part on the response due to mistuning and damping.

In another refinement, the method may further comprise using the at least one computer processor to display the probability of HCF over the predetermined parameter space in a histogram.

In yet another refinement, the method may further comprise analyzing which parametric data most contributes to the probability of HCF.

According to another embodiment of the present disclosure, a method for assessing a risk of high cycle fatigue in a gas turbine engine having an array of airfoils is disclosed. The method may comprise determining parametric data for an airfoil; generating at least one flexible model based on the parametric data for the airfoil; generating at least one emulator based on the at least one flexible model; determining a damped, mistuned response of the airfoil in the gas turbine engine; and generating a distribution of stresses on the airfoil based at least in part on the parametric data, the at least one emulator, and the damped, mistuned response.

In a refinement, the method may further comprise determining parametric data including internal and external airfoil geometry, material properties, crystallographic orientation, fatigue capability, loading properties, axial gapping, airfoil angles, thermal characteristics, heat transfer coefficients, cooling hole diameters, and film thicknesses.

In another refinement, the method may further comprise using at least one of a computer aided design tool and a finite element mesh-morphing tool to generate the at least one flexible model.

In another refinement, the method may further comprise using at least one of principal component analysis, proper orthogonal decomposition, Gaussian stochastic processes, response surface techniques, computer software, and Bayesian calibration methods to generate the at least one emulator.

In another refinement, the method may further comprise using a frequency-based mistuning assessment tool and a damping assessment tool to determine the damped, mistuned response of the airfoil.

In another refinement, the method may further comprise combining the damped, mistuned response of the airfoil with the at least one emulator to generate the distribution of stresses on the airfoil.

In another refinement, the method may further comprise analyzing the distribution of stresses on the airfoil in relation to the parametric data for the airfoil, and identifying the parametric data that most contributes to the distribution of stresses.

In a related refinement, the method may further comprise changing the parametric data to generate a narrow distribution of stresses.

According to yet another embodiment of the present disclosure, a system for optimizing a design of an airfoil of a gas turbine engine is disclosed. The system may comprise a computer processor, an input/output device receiving parametric data related to the design of the airfoil; a flexible model generated by the computer processor based on the parametric data; and an emulator generated by the computer processor to simulate the flexible model; wherein the computer processor determines a damped, mistuned response of the airfoil during operation of the gas turbine engine, and generates a distribution of frequencies, mode shapes, and vibratory stress levels of the airfoil using the emulator and the damped, mistuned response of the airfoil.

In a refinement, the parametric data may include at least one of internal and external airfoil geometry, material properties, crystallographic orientation, fatigue capability, loading properties, axial gapping, airfoil angles, thermal characteristics, heat transfer coefficients, cooling hole diameters, and film thicknesses.

In another refinement, the computer processor may be operatively configured to receive changes to the set of parametric data.

In another refinement, the flexible model may be configured to support structural and thermal sensitivity analysis.

In another refinement, the emulator may be a surrogate model based on mathematical analysis techniques.

In another refinement, the computer processor may be operatively configured to combine the damped, mistuned response of the airfoil with the emulator to generate the distribution of frequencies, mode shapes, and vibratory stress levels on the airfoil.

In yet another refinement, the computer processor may be operatively configured to utilize at least one of existing data, laser holography, strain gages, non-interference stress measurement system data, experimental data, and bench, spin and engine test data to validate the distribution of frequencies, mode shapes, and vibratory stress levels on the airfoil.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
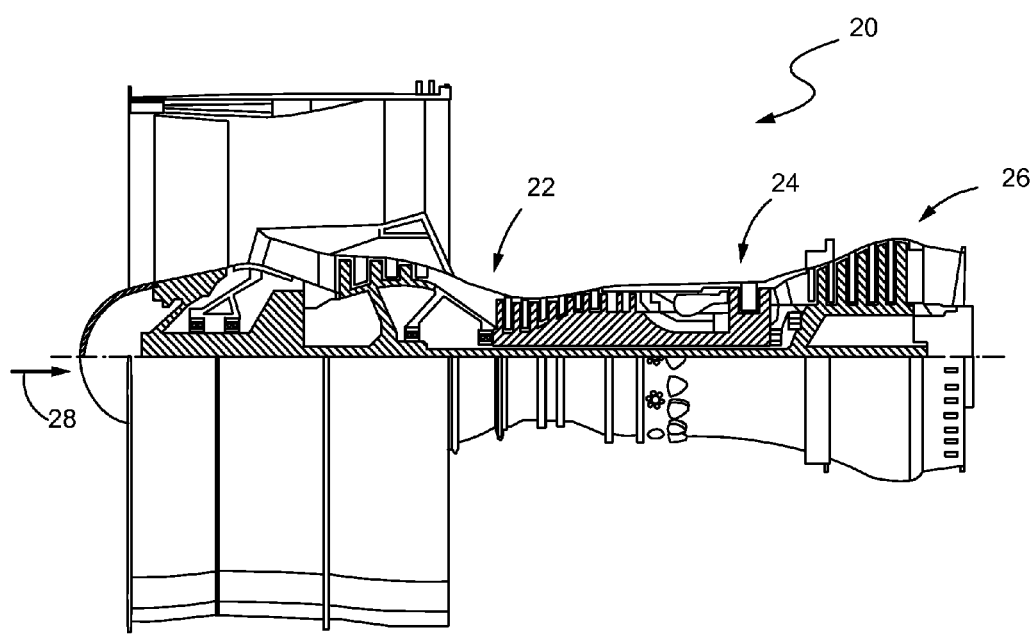
FIG. 1 is a cross-sectional view of a gas turbine engine that may be used for HCF risk analysis.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. Gas turbine engine 20 may be used on an aircraft for generating thrust or power, or in land-based operations for generating power as well.

Figure 2:
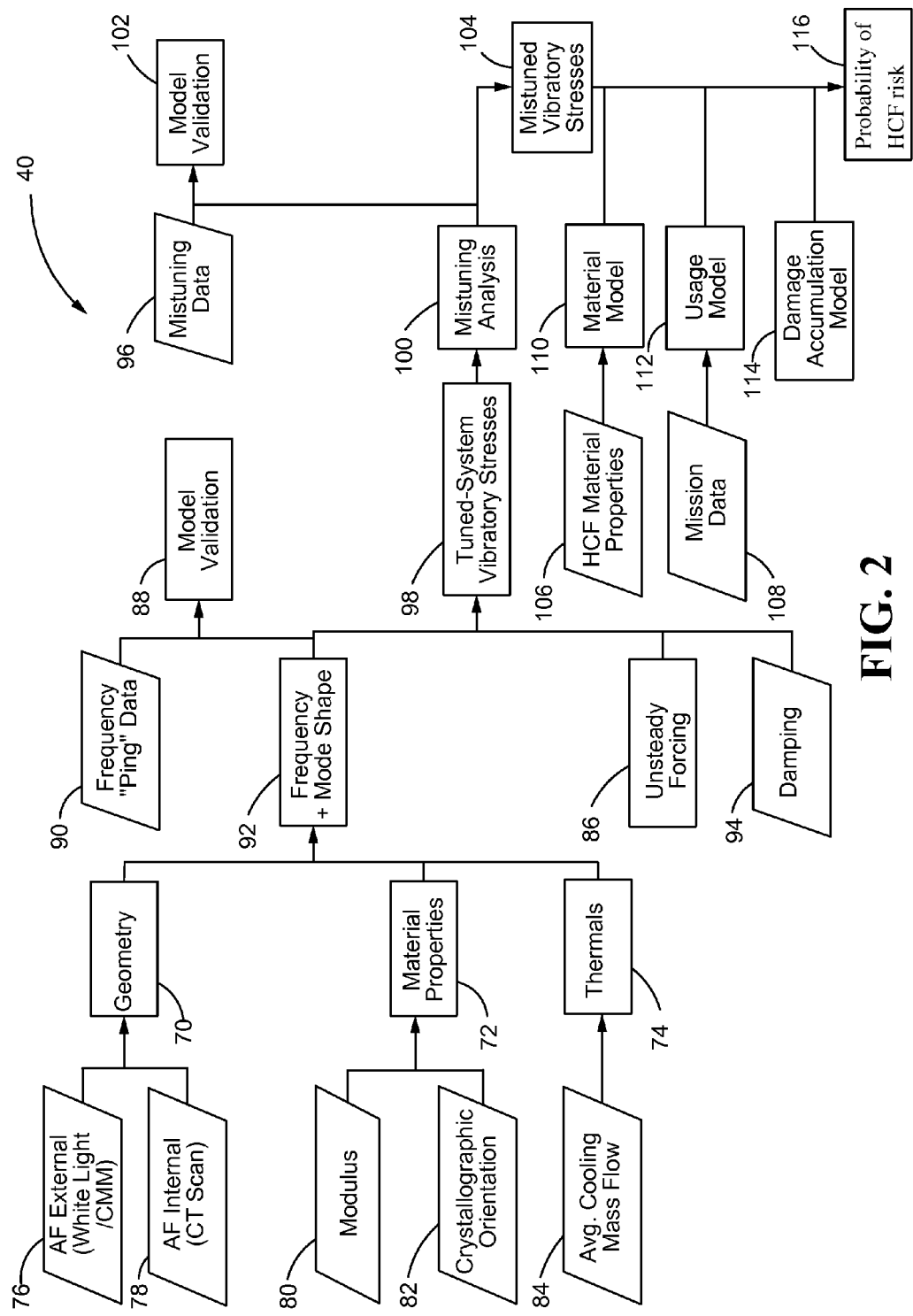
FIG. 2 is a schematic representation of a system for predicting HCF risk to enable optimizing a design of an airfoil, according to an exemplary embodiment of the present disclosure.
Figure 3:
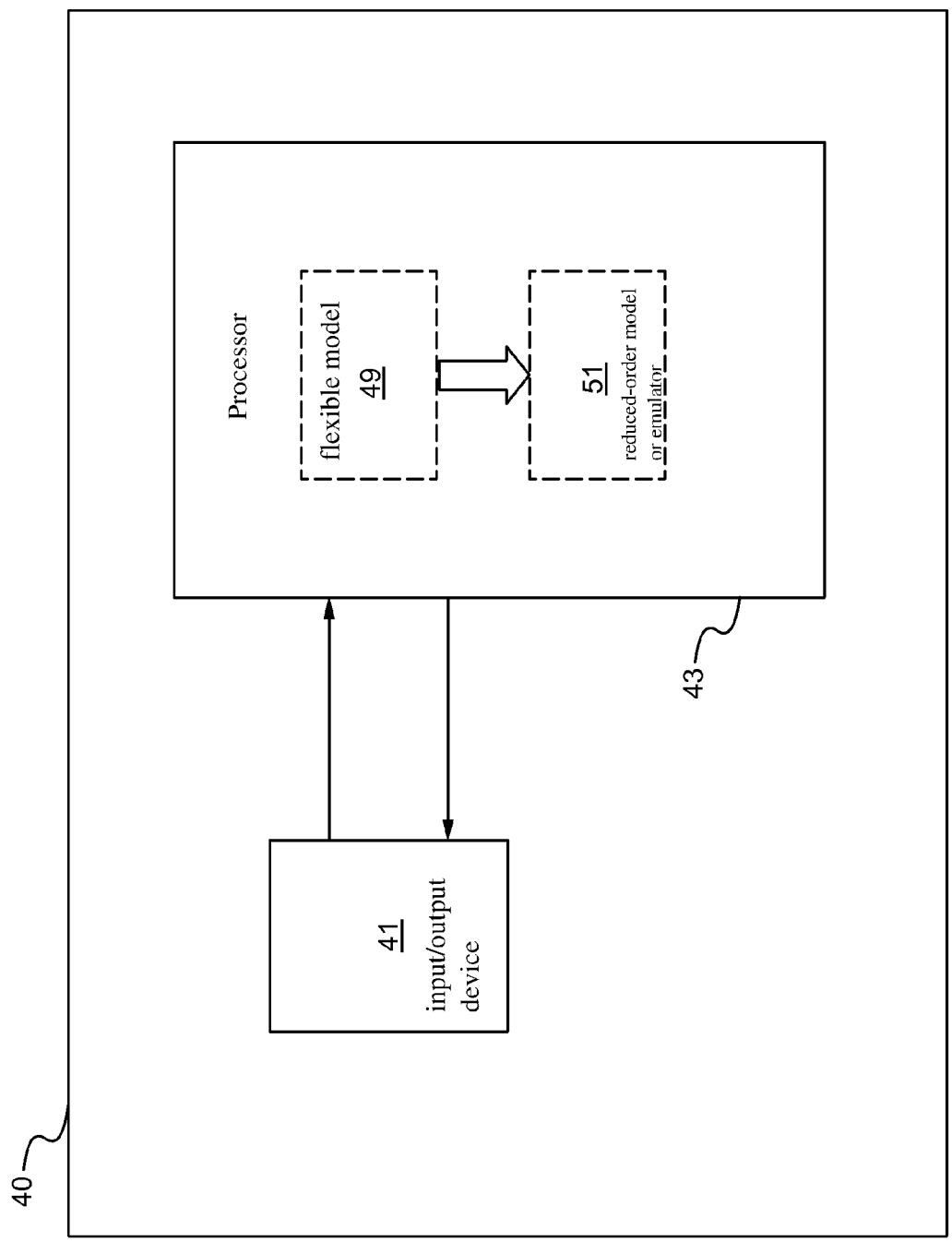
FIG. 3 is a schematic representation of an exemplary architecture of the system of FIG. 2.
Figure 4:
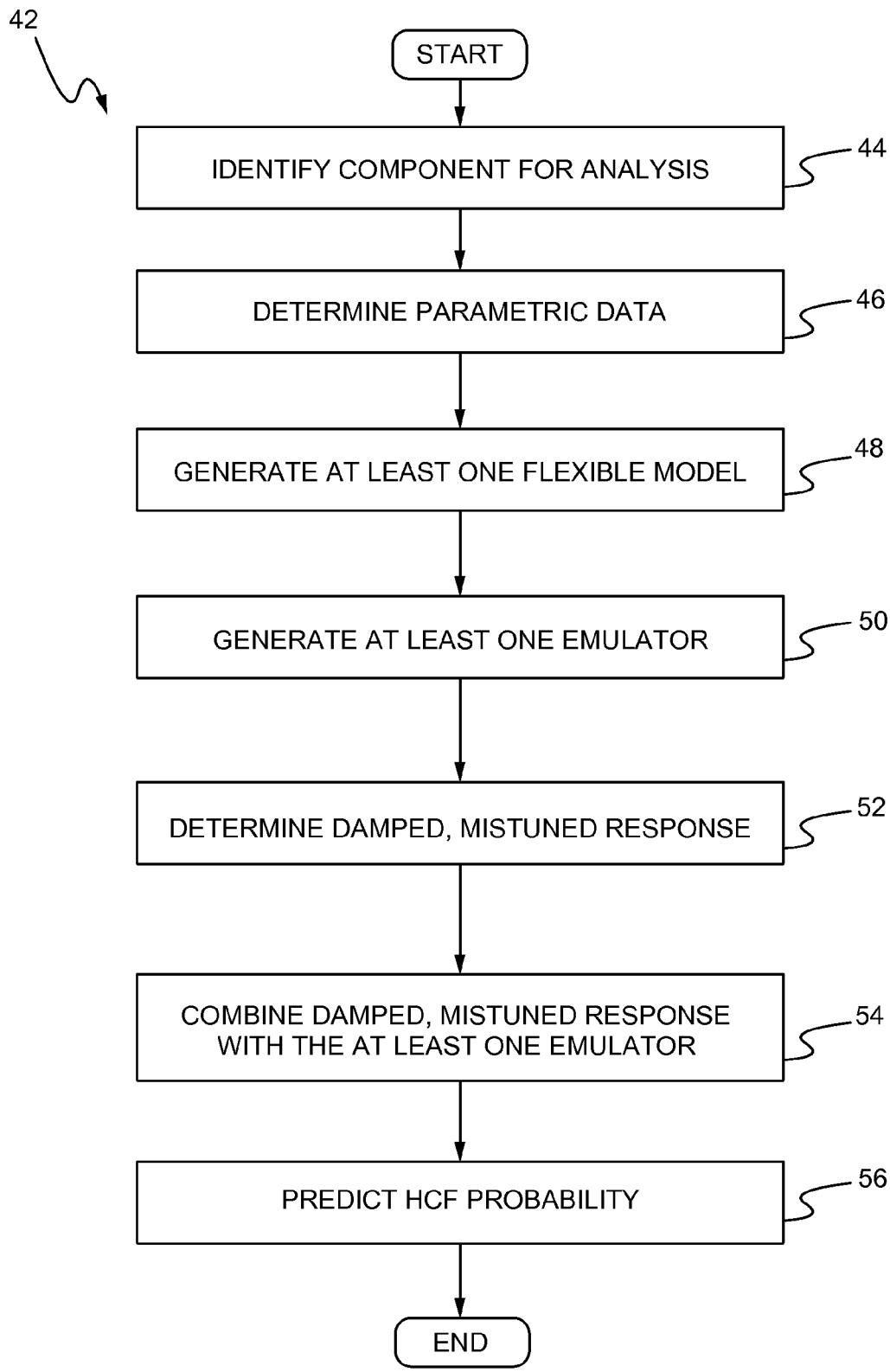
FIG. 4 is a flow diagram outlining a method for assessing HCF risk in a design of a gas turbine engine, according to another exemplary embodiment of the present disclosure.

Turning now to FIGS. 2-4, a system 40 and method 42, respectively, for assessing high cycle fatigue (HCF) risk in a design of the gas turbine engine 20 is shown, according to exemplary embodiments of the present disclosure. The system 40 may implement at least part of method 42 and may comprise an input/output device 41 and any non-transitory computer readable storage medium, such as at least one computer processor 43, as shown best in FIG. 3.

Figure 5:
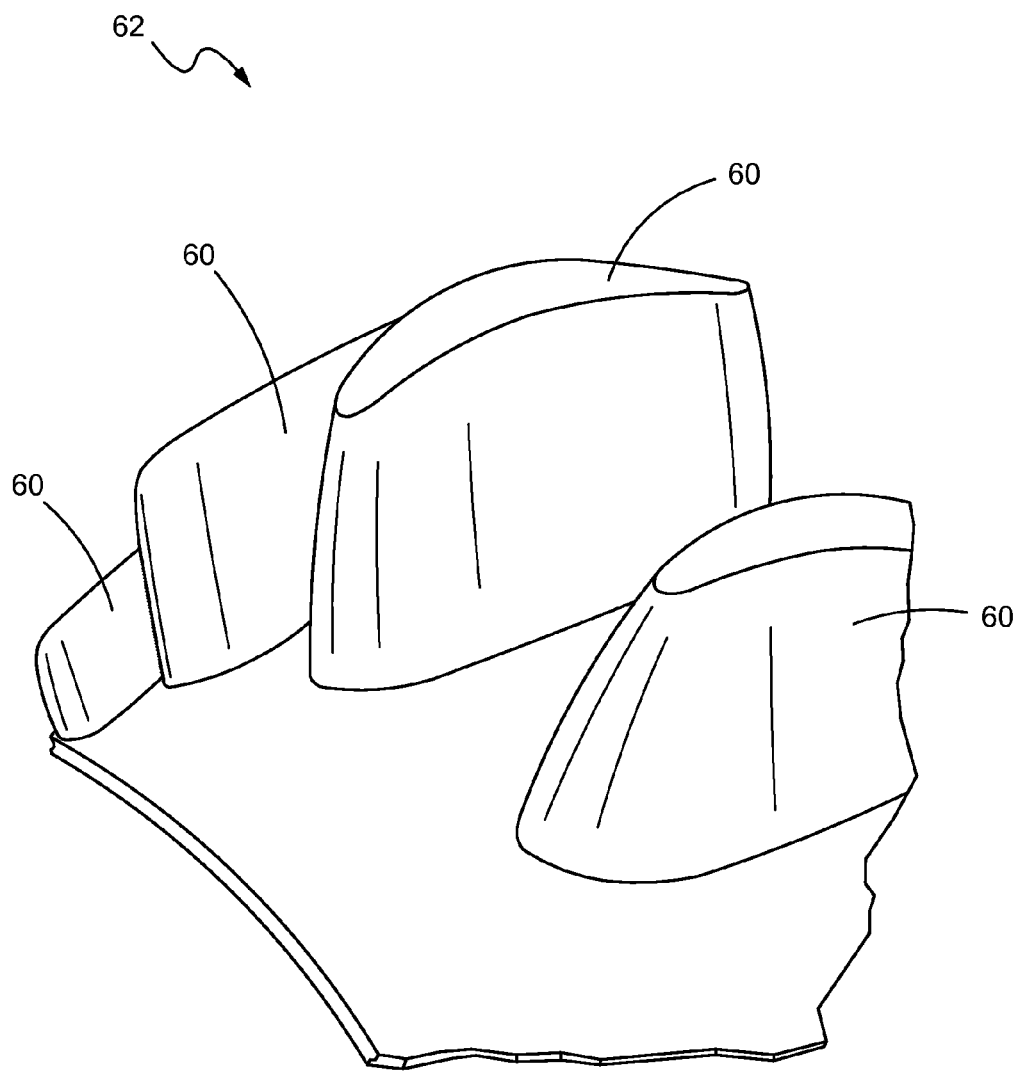
FIG. 5 is a perspective view of an airfoil array of the gas turbine engine of FIG. 1.

At a first step 44 in the method 42 of FIG. 4, a component for HCF analysis is identified. The method 42 may be applied to any component of the gas turbine engine 20. For example, the method 40 may be applied to an airfoil 60 or array 62 of airfoils 60, shown in FIG. 5. The array 62 of airfoils 60 may comprise a stage of rotor blades or stator vanes in the compressor section 22 or turbine section 26 of the gas turbine engine 20. Of course, the HCF method and system of the present disclosure can be used to analyze any number of other gas turbine engine components, with the airfoil 60 being but one example.

At a next step 46, parametric data for the component is determined. Parametric data may include any data related to the variability of the component from manufacture. Distributions for each of the relevant input parameters may be collected. As shown in FIG. 2, exemplary airfoil manufacturing data may include, but not be limited to, parameter variations related to geometry 70, material properties 72, and thermal parameters 74, such as internal airfoil geometry 76, external airfoil geometry 78, modulus 80, crystallographic orientation 82, and average cooling mass flow 84. Other parametric data may also include, but not be limited to, unsteady forcing or loading characteristics 86, axial gapping, blade/vane stagger angles, fatigue capability, heat transfer coefficients, and cooling hole diameters. A white-light airfoil scan, computed tomography scan, and/or other means may be used to determine the parametric data.

After the parametric data is obtained, at a next step 48, at least one flexible model 49 (FIG. 3) of the identified component may be generated from the data. Based on the parametric data, multiple flexible models may be generated to support structural and thermal analysis. For example, the parametric data may be input into a computer aided design tool and/or a finite element mesh-morphing tool in order to build the at least one flexible model. When the input data is changed, the flexible modeling tools can change the model accordingly, and the process may be iterated to create multiple models. Model validation 88 of the at least one flexible model 49, may also require individual airfoil frequency data 90, information related to frequency and mode shape 92 determined from the parametric data, or other input data, as shown in FIG. 2.

Next, at a step 50, at least one reduced-order model or emulator 51 (FIG. 3) may be generated from the at least one flexible model. The emulators may act as surrogates for the multiple flexible models in order to enable computationally efficient analysis across the design, manufacturing, and anticipated usage space. For example, the emulators may be used to quickly run simulations, identify patterns in the highly dimensional parametric data set, capture geometric variation and characterize dynamic behavior of the manufactured airfoils, and provide a more comprehensive understanding of the variations in frequency, modeshape, and modal work, with other analyses being possible as well. Reduced order modeling approaches to create the emulators may include, but not be limited to, the use of mathematical analysis techniques, principal component analysis, proper orthogonal decomposition, Gaussian stochastic processes, response surface techniques, and Bayesian calibration methods.

At a step 52, a damped, mistuned response of the identified component may be determined. For example, under-platform dampers may be used in airfoils 60 to mitigate HCF. In addition, mistuning may occur in a stage of airfoils 60 during engine operation due to the blade-to-blade manufacturing variability. Different tools and methods, such as a frequency-based mistuning assessment tool, geometry-based mistuning assessment tool, damping response assessment tool, response surface approach, mistuning-friction prediction tool, or combinations thereof, may be used to determine the response of mistuning and damping to the airfoils 60. It is to be understood that when applying method 42 to other gas turbine engine components, such as cases or combustor liners, determining a response to mistuning may not be applicable.

At a next step 54, the damped, mistuned response from step 52 may be combined with results from the emulators of step 50 in order to achieve a comprehensive HCF analysis. As shown in the system 40 of FIG. 2, damping data 94 and mistuning data 96, along with tuned-system vibratory stresses 98 (predicted from step 50 in FIG. 4) and results from mistuning analysis 100 (step 52), may be used for model validation 102 of the at least one emulator combined with the damped, mistuned response. Moreover, the damping data 94, mistuning data 96, tuned-system vibratory stresses 98, and mistuning analysis 100 may also be used to generate mistuned vibratory stresses 104. In combining the emulators with the response from damping and mistuning, a global dynamics of the entire array 62 of airfoils 60, such as a variation in airfoil response that results from the coupling between airfoils, is accounted for in the HCF risk assessment.

Lastly, at a final step 56 of the method 42, based on the parametric data, flexible models, emulators, and response to damping and mistuning, the distribution of vibratory stress levels may be predicted. The combined damped, mistuned response with the emulators may be used to quantify HCF risk across the design, manufacturing, and anticipated or actual usage space. As shown in FIG. 2, HCF material properties 106 and mission data 108 may also be input into the system 40 to generate a material model 110 and usage model 112 of the component. Bringing together results from the mistuned vibratory stresses 104, material model 110, usage model 112, and a damage accumulation model 114, a probability of HCF risk 116 may be predicted. For example, the system 40 may output a distribution of stress levels, frequencies, mode shapes, vibratory stresses, and HCF risk on the component.

The distribution of stresses and probability of HCF may be displayed over the parameter space in the form a histogram or the like. After analyzing the stress distribution in relation to the input parametric data, parameters that most contribute to the probability of HCF risk may be identified. The HCF risk may be compared against risk criteria to determine whether the level of HCF risk is allowable. The input data for the identified parameters may then be changed and the component design may be targeted to generate a narrow distribution of stresses. By constraining the variability on the identified parameters, the design of the component may be optimized to reduce the risk of HCF. In addition, existing manufacturing data, computational fluid dynamics results, laser holography, strain gages, non-interference stress measurement system data, experimental data, and bench, spin and engine test data may be used to validate the output distribution of frequencies, mode shapes, and vibratory stresses on the component.

It is to be understood that the disclosed system 40 and method 42 may be applied to any component of the gas turbine engine, in addition to airfoils. Furthermore, the disclosed system and method may be modified to evaluate HCF risk in any component of the gas turbine engine. For example, system modules and method steps may be modified, without departing from the scope of the disclosure.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a system and method for assessing HCF risk in the design of gas turbine engines. The system and method disclosed herein utilizes a novel, probabilistic approach that accounts for inherent variability in a manufactured part of the gas turbine engine. By leveraging computational tools, flexible modeling techniques, and emulation methods, the disclosed system and method better quantifies HCF risk across the design, manufacturing, and anticipated usage space and provides for a more comprehensive analysis of the distribution of stress levels, frequencies, mode shapes, and vibratory stresses in or on the part. Using the design, analysis and validation techniques disclosed herein, an optimal design of the part may be achieved to reduce the probability of HCF risk, which thereby results in a longer part life, extended engine life, reduced maintenance costs, and improved aircraft safety.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A method for analyzing high cycle fatigue (HCF) in a design of a gas turbine engine, comprising:
   identifying a component of the gas turbine engine for high cycle fatigue analysis;
   inputting parametric data of the component over a predetermined parameter space into at least one computer processor;
   using the at least one computer processor to build a plurality of flexible models of the component based on the parametric data of the component over the predetermined parameter space;
   using the at least one computer processor to build a plurality of emulators of the component based on the plurality of flexible models; and using the at least one computer processor to predict a probability of HCF based at least in part on the parametric data of the component over the predetermined parameter space and the plurality of emulators.

2. The method of claim 1, further comprising using the at least one computer processor to assess a response due to mistuning and damping.

3. The method of claim 2, further comprising using the at least one computer processor to combine the response due to mistuning and damping on the component with the plurality of emulators, and to predict the probability of HCF based at least in part on the response due to mistuning and damping.

4. The method of claim 1, further comprising using the at least one computer processor to display the probability of HCF over the predetermined parameter space in a histogram.

5. The method of claim 1, further comprising analyzing which parametric data most contributes to the probability of HCF.

6. A method for assessing a risk of high cycle fatigue in a gas turbine engine having an array of airfoils, comprising:
   determining parametric data for an airfoil;
   generating at least one flexible model based on the parametric data for the airfoil;
   generating at least one emulator based on the at least one flexible model;
   determining a damped, mistuned response of the airfoil in the gas turbine engine; and
   generating a distribution of stresses on the airfoil based at least in part on the parametric data, the at least one emulator, and the damped, mistuned response.

7. The method of claim 6, further comprising determining parametric data including internal and external airfoil geometry, material properties, crystallographic orientation, fatigue capability, loading properties, axial gapping, airfoil angles, thermal characteristics, heat transfer coefficients, cooling hole diameters, and film thicknesses.

8. The method of claim 6, further comprising using at least one of a computer aided design tool and a finite element mesh-morphing tool to generate the at least one flexible model.

9. The method of claim 6, further comprising using at least one of principal component analysis, proper orthogonal decomposition, Gaussian stochastic processes, response surface techniques, computer software, and Bayesian calibration methods to generate the at least one emulator.

10. The method of claim 6, further comprising using a frequency-based mistuning assessment tool and a damping assessment tool to determine the damped, mistuned response of the airfoil.

11. The method of claim 6, further comprising combining the damped, mistuned response of the airfoil with the at least one emulator to generate the distribution of stresses on the airfoil.

12. The method of claim 6, further comprising analyzing the distribution of stresses on the airfoil in relation to the parametric data for the airfoil, and identifying the parametric data that most contributes to the distribution of stresses.

13. The method of claim 12, further comprising changing the parametric data to generate a narrow distribution of stresses.

14. A system for optimizing a design of an airfoil of a gas turbine engine, comprising:
   a computer processor;
   an input/output device receiving parametric data related to the design of the airfoil;
   a flexible model generated by the computer processor based on the parametric data; and
   an emulator generated by the computer processor to simulate the flexible model;
   wherein the computer processor determines a damped, mistuned response of the airfoil during operation of the gas turbine engine, and generates a distribution of frequencies, mode shapes, and vibratory stress levels of the airfoil using the emulator and the damped, mistuned response of the airfoil.

15. The system of claim 14, wherein the parametric data includes at least one of internal and external airfoil geometry, material properties, crystallographic orientation, fatigue capability, loading properties, axial gapping, airfoil angles, thermal characteristics, heat transfer coefficients, cooling hole diameters, and film thicknesses.

16. The system of claim 14, wherein the computer processor is operatively configured to receive changes to the parametric data.

17. The system of claim 14, wherein the flexible model is configured to support structural and thermal sensitivity analysis.

18. The system of claim 14, wherein the emulator is a surrogate model based on mathematical analysis techniques.

19. The system of claim 14, wherein the computer processor is operatively configured to combine the damped, mistuned response of the airfoil with the emulator to generate the distribution of frequencies, mode shapes, and vibratory stress levels on the airfoil.

20. The system of claim 14, wherein the computer processor is operatively configured to utilize at least one of existing data, laser holography, strain gages, non-interference stress measurement system data, experimental data, and bench, spin and engine test data to validate the distribution of frequencies, mode shapes, and vibratory stress levels on the airfoil.

* * * * *